(12) United States Patent
Dasari et al.

(10) Patent No.: US 8,136,119 B2
(45) Date of Patent: Mar. 13, 2012

(54) METHOD, APPARATUS AND MEDIA FOR MANAGING INFORMATION MODEL JOBS

(75) Inventors: RadhaKrishna Reddy Dasari, Round Rock, TX (US); Jon Hass, Austin, TX (US); Chandrasekhar Mugunda, Austin, TX (US); Khachatur Papanyan, Austin, TX (US); Jianwen Yin, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 1502 days.

(21) Appl. No.: 11/565,612

(22) Filed: Nov. 30, 2006

(65) Prior Publication Data

US 2008/0134197 A1    Jun. 5, 2008

(51) Int. Cl.
*G06F 9/46* (2006.01)
*G06F 9/00* (2006.01)
(52) U.S. Cl. .......................... 718/106; 713/2
(58) Field of Classification Search .................. None
See application file for complete search history.

(56) References Cited

U.S. PATENT DOCUMENTS

| | | |
|---|---|---|
| 6,275,944 B1 | 8/2001 | Kao et al. |
| 6,317,748 B1 | 11/2001 | Menzies et al. |
| 6,470,422 B2 * | 10/2002 | Cai et al. ................. 711/129 |
| 6,671,721 B1 * | 12/2003 | Branson et al. ............ 709/224 |
| 6,694,201 B1 | 2/2004 | Lee et al. |
| 7,058,468 B2 | 6/2006 | Ohtani et al. |
| 7,062,516 B2 | 6/2006 | Bhat |
| 2004/0152951 A1 | 8/2004 | Bhattacharjee et al. |
| 2005/0006468 A1 | 1/2005 | Fandel et al. |
| 2006/0026016 A1 | 2/2006 | Honda et al. |

* cited by examiner

*Primary Examiner* — Camquy Truong
(74) *Attorney, Agent, or Firm* — Garrana Tran LLP; Andrea E. Tran

(57) ABSTRACT

Methods, apparatus and media for managing jobs of an object-oriented information model. Managing includes maintaining and updating job status information resuming interrupted jobs following a reboot of the host system, issuing job references to clients, and manipulating job data for example, listing, retrieving, and/or deleting job data. Each job of an object-oriented model may be represented in a cache by a data section comprising data describing the corresponding job. Data includes a unique identifier, job state information, action after reboot information, and whether the job requires that the system undergo a reboot.

11 Claims, 4 Drawing Sheets

FIG. 1

```
<CIM_ConcreteJob_Status>
    <CIM_ConcreteJob>
        <InstanceID>
            1
        </InstanceID>
        <RequestReboot>
            True
        </RequestReboot>
        <ActionafterReboot>
            Check_update();  <!--verify if the BIOS version has been updated to the desired version -->
        </ActionafterReboot>
        <JobState>
            In progress
        </Status>
    </CIM_ConcreteJob>
    <CIM_ConcreteJob>
        <InstanceID>
            2
        </InstanceID>
        <RequestReboot>
            False
        </RequestReboot>
        <ActionafterReboot>
            Resume(task);
        </ActionafterReboot>
        <JobState>
            In progress
        </Status>
    </CIM_ConcreteJob>
</CIM_ConcreteJob_Status>
```

METHOD, APPARATUS AND MEDIA FOR MANAGING INFORMATION MODEL JOBS

BACKGROUND

1. Technical Field

The present disclosure relates generally to information handling systems and more particularly, to object-oriented management information models.

2. Background Information

As the value and use of information continues to increase, individuals and businesses seek additional ways to process and store information. One option available to users is an information handling system. An information handling system generally processes, compiles, stores, and/or communicates information or data for business, personal, or other purposes thereby allowing users to take advantage of the value of the information. Because technology and information handling needs and requirements vary between different users or applications information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

As the capabilities, diversity, and size of computer systems and networks continue to increase, the complexity of system management also increases. Developing and unifying management standards for desktop, enterprise and Internet environments is a main goal of the Distributed Management Task Force Inc. (DMTF). DMTF standards are platform-independent and technology neutral, and facilitate cost effective system management. The DMTF's Common Information Model (CIM) standard is an object-oriented management information model that unifies and extends existing management standards, such as for example, Simple Network Management Protocol (SNMP), Desktop Management Interface (DMI), and Common Management Information Protocol (CMIP). The CIM specification defines the syntax and rules of the model and how CIM can be integrated with other management models, while the CIM schema comprises the descriptions of the models.

The CIM standard schema may define thousands of classes with properties and associations for logical and physical modeling. The schema may represent one or many components of an information handling system including, but not limited to, fans, power supplies, processors, and firmware. The CIM schema class definitions also include methods. Organization of the classes is accomplished by use of namespaces, which function as logical databases. DMTF Profiles are specifications that define the CIM model and associated behavior for a management domain. The profiles define requirements regarding the classes and associations used to represent the management information in a given management domain Generally, within a CIM Object Manager (CIMOM), profiles are implemented by different providers in one or more namespaces, The CIMOM provides an interface, which allows a provider to expose the instances of CIM classes, and a client application to read and/or write properties and invoke methods.

Many of the CIM methods include management tasks, such as, for example but not limited to, updates and diagnostics. Many of the methods and tasks/jobs may require a long period of time in order to be completed. As used herein, the words "task" and "job" may be used interchangeably. In a CIM environment, a provider may return a job handle to a client using the "Job" output parameter on the invoked CIM method, thereby effectively making the invocation asynchronous. The job handle may be represented by a CIM reference to an instance of a CIM class arbitrarily named CIM_ConcreteJob. The reference may be used at any time by a client to request an actual instance of CIM_ConcreteJob, and to check the status of a job. Providers are challenged by numerous issues, for example but not limited to, managing tasks/jobs, staying abreast of job status, restarting jobs that have been aborted, and providing a job handle to a client for each job requested by the client. The present disclosure may enable the maintenance of job status information even after an unexpected shutdown of the system, a reboot of the system, and/or a CIMOM being stopped and restarted. In other non-limiting embodiments, the methods, apparatus and products of the present disclosure may enable restarting jobs that have been aborted, for example as a result of an unexpected shutdown of the system, a reboot of the system, or the CIMOM stalling or stopping and being restarted. In other non-limiting embodiments, the methods, apparatus and products of the present disclosure provide a job handle to a client for each job requested by the client. In other non-limiting embodiments, the methods, apparatus and products of the present disclosure provide a cache for CIM job data/information.

SUMMARY

The following presents a general summary of some of the many possible embodiments of this disclosure in order to provide a basic understanding of this disclosure. This summary is not an extensive overview of all embodiments of the disclosure. This summary is not intended to identify key or critical elements of the disclosure or to delineate or otherwise limit the scope of the claims. The following summary merely presents some concepts of the disclosure in a general form as a prelude to the more detailed description that According to one non-limiting embodiment there is provided a computer-implemented method for managing jobs comprising the steps of initiating a job of an object-oriented model on an information handling system, and creating a data section in a cache wherein the data section describes the job and comprises a job state parameter having a value describing the status of said job. The method also comprises the step of updating the value of the job state parameter each time the status of the corresponding job changes.

According to another non-limiting embodiment there is provided a computer-implemented method for managing jobs comprising the steps of accessing a cache comprising at least one data section, wherein each data section describes a corresponding job of an object-oriented model and manipulating the data. Generally each data section comprises an identification parameter having a value unique to the corresponding job, and a job state parameter having a value describing the status of the corresponding job.

According to another embodiment there is provided a computer-implemented method for managing jobs comprising the step of accessing a cache comprising at least one data section, wherein each data section describes a corresponding job of an object-oriented model wherein each data section comprises a job state parameter having a value describing the status of the corresponding job, and wherein each data section comprises an action after startup parameter which defines if any action is to be performed on the corresponding job during startup of an information handling system of said object-oriented model. The method also comprises the steps of selecting each data section having a job state value of running, and executing the action defined by the action after startup parameter for each of the selected data sections having a job state value of running.

BRIEF DESCRIPTION OF THE DRAWINGS

The following drawings illustrate some of the many possible embodiments of this disclosure in order to provide a basic understanding of this disclosure, These drawings do not provide an extensive overview of all embodiments of this disclosure. These drawings are not intended to identify key or critical elements of the disclosure or to delineate or otherwise limit the scope of the claims. The following drawings merely present some concepts of the disclosure in a general form. Thus, for a detailed understanding of this disclosure, reference should be made to the following detailed description, taken in conjunction with the accompanying drawings, in which like elements have been given like numerals.

FIG. 1 depicts non-limiting XML file named CIM_ConcreteJob_Status.xmrl.

DETAILED DESCRIPTION

Figure 2:
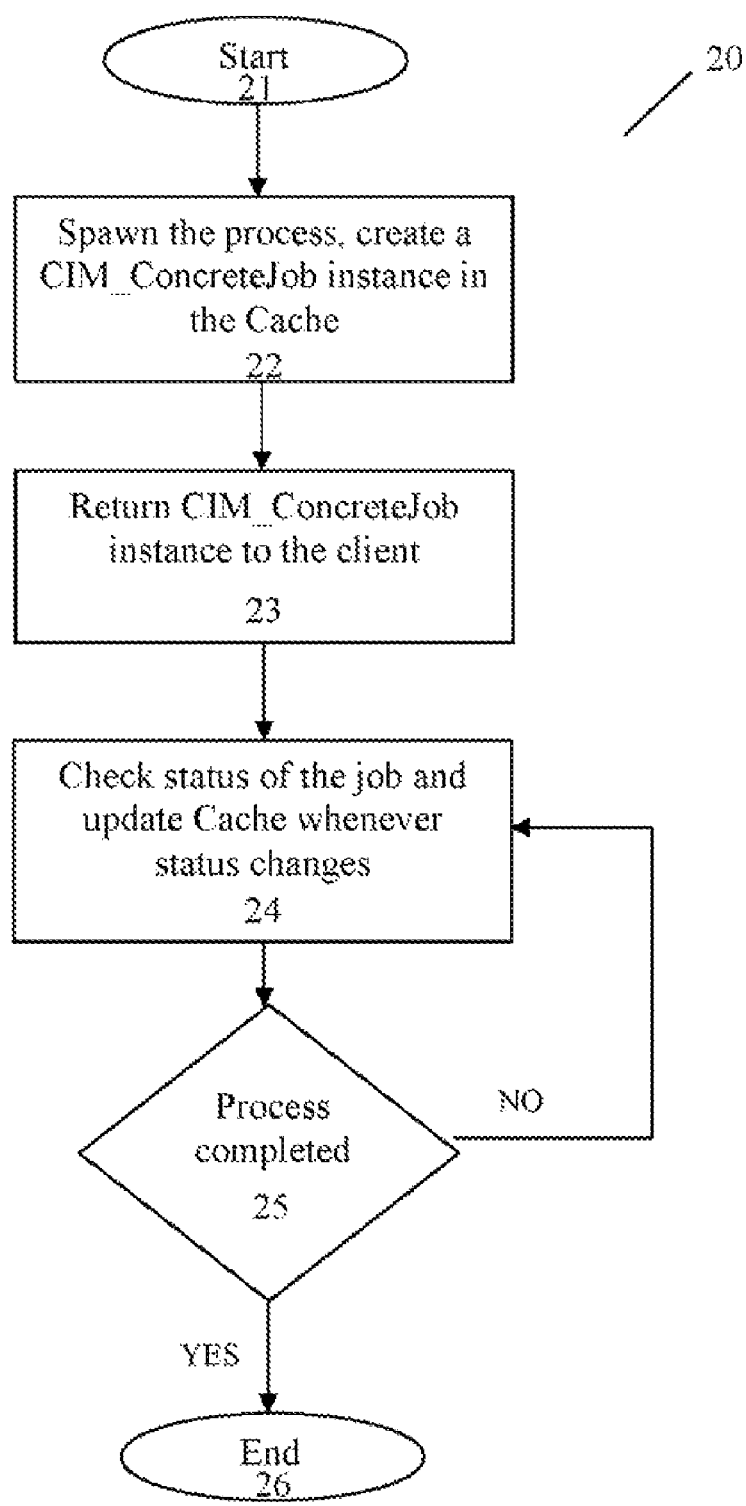
FIG. 2 provides a flowchart 20 illustrating an example method for creating instances of the class CIM_ConcreteJob.

For purposes of this disclosure, an embodiment of an Information Handling System (IHS) may include any instrumentality or aggregate of instrumentalities operable to compute, classify, process, transmit, receive, retrieve, originate, switch: store, display, manifest, detect, record, reproduce handle, or utilize any form of information, intelligence or data for business, scientific, control, or other purposes. For example, an IHS may be a personal computer, a network storage device, or any other suitable device and may vary in size, shape, performance, functionality and price. The IHS may include random access memory (RAM), one or more processing resources such as a central processing unit (CPU) or hardware or software control logic: ROM, and/or other types of nonvolatile memory, Additional components of the IHS may include one or more disk drives, one or more network ports for communicating with external devices as well as various input and output (I/O) devices, such as a keyboard, a mouse, and a video display. The IHS may also include one or more buses operable to transmit data communications between the various hardware components.

The job information relating to the CIM job instances of the present disclosure is generally stored in a central repository or cache. Generally a cache useful in the present disclosure may be a file written in any language known in the art to be useful for encoding structured information and/or representing data. In one embodiment of the present disclosure, the file may serve as a cache for information corresponding to CIM_ConcreteJob instances. The file may comprise one or more sections wherein each section may correspond to an instance of CIM_ConcreteJob. The file may comprise one or more sections wherein each section may comprise a tag or parameter defining a unique identifier for the job corresponding to the section, for example an InstanceID tag. In other embodiments of the present disclosure, the file may serve as a cache for job status information corresponding to instances of CIM_ConcreteJob. The file may comprise one or more sections wherein each section may comprise a tag or parameter defining the job status for the job corresponding to the section, including but not limited to, a JobState tag. In other illustrative embodiments, the file may comprise one or more sections wherein each section may comprise a tag or parameter defining whether or not an action is to be carried out on the job corresponding to the section if the job becomes interrupted, including but not limited to, an ActionAfterReboot tag. In even other non-limiting embodiments of the present disclosure, the file may comprise one or more sections wherein each section may comprise a tag or parameter defining whether the job corresponding to the section requires the computing system to undergo a reboot, for example, RequestReboot tag. In still other non-limiting embodiments of the present disclosure, the file may comprise one or more sections wherein each section may comprise any tag or parameter known in the art to be useful for defining job data/information.

Referring now to FIG. 1, there is provided a non-limiting example of a cache named CIM_ConcreteJob_Status.xml. It should be understood that the names of extensions and/or classes utilized herein were arbitrarily selected within the rules of the existing CIM. Classes and/or extensions included in the present disclosure are not intended to be limited to particular names. Rather, focus is to be directed to the function, characteristics and operation of the class and/or extension with the understanding that any name may be utilized. In one non-limiting embodiment of the disclosure, the cache is a file written in Extensible Mark-up Language (XML). The syntax for XML files is known by those of skill in the art.

The XML file represented in FIG. 1 defines job status information relating to instances of the class CIM_ConcreteJob. As indicated in FIG. 1, each CIM_ConcreteJob section of the file corresponds to a particular job represented by a CIM_ConcreteJob instance. Also indicated in FIG. 1, each CIM_ConcreteJob section of the file comprises an InstanceID tag. The InstanceID value may be any applicable value known in the art. Generally the InstanceID is a unique identifier for a particular job and no two CIM_ConcreteJob instances share the same InstanceID value. In FIG. 1, there are two non-limiting instances of CIM_ConcreteJob depicted, one having an InstanceID value of "1" and the other having an InstanceID value of "2".

Still referring to FIG. 1, each CIM_ConcreteJob section of the file comprises a RequestReboot tag. The value for the RequestReboot tag may be any applicable value known in the ad. In the file depicted in FIG. 1, the RequestReboot tag value may be either "True" or "False". A value of "True" indicates the job requires that the system be rebooted, whereas a value of "False" indicates the job may not require a reboot of the system. For example, the job corresponding to the first CIM_ConcreteJob instance depicted in FIG. 1 requires that the system be rebooted, whereas the job corresponding to the second CIM_ConcreteJob instance depicted in FIG. 1 may not require a reboot.

Each CIM_ConcreteJob section depicted in FIG. 1 may also comprise an ActionAfterReboot tag. The ActionAfterReboot tag defines which action, if any action, is to be carried out following a reboot of the system. For example, in the first CIM_ConcreteJob instance depicted in FIG. 1, the actions to be taken after a reboot are to check the update and verify whether the BIOS version has been updated to the desired version. For the second CIM_ConcreteJob instance depicted in FIG. 1, the actions to be taken after a reboot are to resume the task. An undefined ActionAfterReboot tag is generally interpreted as indicating that the status of the corresponding job may be defined as completed. With respect to job status, each CIM_ConcreteJob section depicted in FIG. 1 may comprise a JobState tag. The JobState tag value defines the job's status and may be any applicable value known in the art including, but not limited to, "running", "in progress", "completed", "terminated", "aborted". Both the first and second CIM_ConcreteJob instances depicted in FIG. 1 comprise a JobState value of "In progress" indicating the job corresponding to each instance is running at that time.

Generally in a CIM environment of the present disclosure, when a client invokes a method comprising a CIM_ConcreteJob reference as an output handle parameter, the provider spawns a process to accomplish the client's request. The provider may create a section in a designated cache wherein the section corresponds to an instance of CIM_ConcreteJob and represents the client's requested job. Generally the section will comprise information describing the requested job such as, but not limited to, a unique identifier, whether the job requires a reboot of the system, which action(s) if any, are to be taken if the job is interrupted, and status of the job.

The provider may return to the client a job handle or reference as part of the output parameter of the invoked method. Generally the job handle may comprise a CIM_ConcreteJob reference and the client may use it at any time in order to check the status of the job, and to obtain any information about the job. The provider may maintain communication with the job in order to stay aware of any changes in job status. For any change in the job status of the spawned process, the provider may find the corresponding section in the cache and update the job status information accordingly. The provider may continue to communicate with the spawned process until the process has successfully completed. When the process successfully completes, the provider may update the parameter, which defines the job's status in the appropriate section of the cache to reflect a job status of completed, Referring now to FIG. 2, there is provided flowchart 20 depicting an example method for creating one or more instances of CIM_ConcreteJob. The non-limiting example method starts in step 21 when a CIM client invokes a method comprising CIM_ConcreteJob as an output parameter. In step 22, the CIM provider may spawn a process to accomplish the client's requested method. Also in step 22, for each spawned process, the CIM provider may create an instance of CIM_ConcreteJob in a designated cache. A cache suitable for use may be the example cache depicted in FIG. 1, the XML file CIM_ConcreteJob_Status.xml. In step 23, the CIM provider may return a CIM_ConcreteJob reference to the client as part of the output parameter of the client's invoked method. In step 24, in order to keep track of any change in the job's status, the CIM provider may maintain communication with the spawned process. If there is any change in the job status, the CIM provider may locate the corresponding CIM_ConcreteJob instance in the cache file and update the tag or parameter, which defines the job's status by changing the job state/status value accordingly. In step 25, if it is determined that the process has successfully completed, then the process may end in step 26. In step 25, if it is determined that the process has not successfully completed, the method loops back to step 24. The loop from step 25 to step 24 may be repeated until it is determined in step 25 that the process has successfully completed in which case the process ends in step 26.

Figure 3:
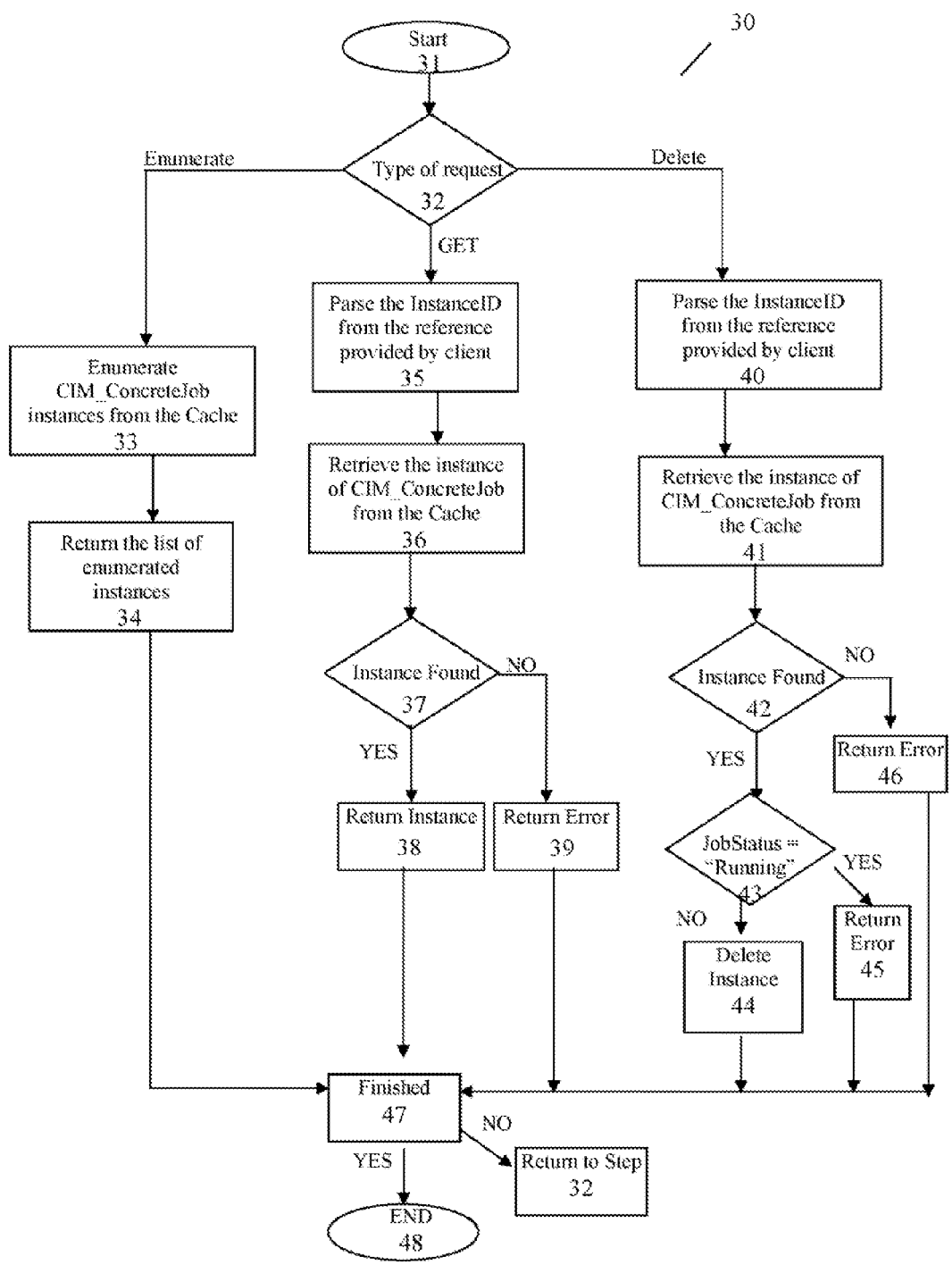
FIG. 3 provides a flowchart 30 illustrating an example method for performing tasks on instances of CIM_ConcreteJob.

Generally, a method of the present disclosure for managing class instances comprises the step of issuing a management task to be performed on any one or more CIM_A instances. The method may include any one or more applicable management tasks known in the art for managing class instances. For example, the method may include any one or more management tasks such as, but not limited to, enumerate, get and delete. A user may choose to perform a single task to any one or more instances, or a user may choose to perform more than one task to any one or more instances. A user may perform any combination of tasks on any one or more instances. For example, a user may choose to enumerate all instances of CIM_ConcreteJob from a cache and, after analyzing the list of instances, the user may choose to delete and/or get any one or more instances, Referring now to FIG. 3, there is shown non-limiting flowchart 30 depicting an example method of managing instances of CIM_ConcreteJob. The example method starts in step 31 when a client issues a request pertaining to one or more CIM_ConcreteJob instances of interest. Generally in a CIM environment, a client request is received by a CIMOM, which may call on a CIM provider to retrieve the requested information. In step 32 of the example method depicted by FIG. 3, the type of request issued by the client determines which step comes next. The non-limiting example method of FIG. 3 illustrates three different management tasks a client may choose to issue: enumerate, get, and delete. If the CIM provider receives a method call from a client to "Enumerate" instances of CIM_ConcreteJob, then in step 33 the provider enumerates all instances of CIM_ConcreteJob. The provider may retrieve the instances from a designated cache. As discussed previously, a cache useful in the present disclosure may be any file known in the art to be useful for encoding structured information and/or representing data. In the example method depicted by FIG. 3, the cache may be the XML file named CIM_ConcreteJob_Status.xml. In step 34, the provider returns a list of enumerated instances to the client.

In step 32 of FIG. 3, if the CIM provider receives a "Get" method call from a client referencing a specific job handle of interest to the client, then in step 35 the provider may parse the unique identifier, such as an instance ID, from the job handle reference provided by the client. In step 36 the provider may attempt to retrieve the instance of CIM_ConcreteJob from the cache. In step 37, if the instance is not found, the action will fail and a return error may be returned to the client in step 39. In step 37, if the instance is found, it may be returned to the client in step 38.

In step 32 of FIG. 3, if the CIM provider receives a "Delete" method call from a client for a CIM_ConcreteJob instance, then in step 40 the provider may parse the unique identifier, such as an instance ID, from the job handle reference provided by the client, In step 41 the provider may attempt to retrieve the instance of CIM_ConcreteJob from the cache. In step 42, if the instance is not found, the delete action will fail and a return error may be returned to the client in step 46. In step 42, if the instance is found, then in step 43 it may be determined if the job corresponding to the instance is in progress by determining the value of the job state parameter or tag. If the answer in step 43 is yes, the job state parameter defines a value indicating the job is in progress or running, then the corresponding instance may not be deleted and the delete action will fail. A return error may be returned to the client in step 45. If the answer in step 43 is no, the job state parameter defines a value indicating the job is not in progress or running, then the instance may be deleted in step 44.

After each of steps 34, 38, 39, 43 and 44, it may be determined in step 47 if the client is finished. If yes, then the method ends in step 48. If no, then the method returns to step 32 and the client may issue a different request, The methods, apparatus and products of the present disclosure enable the management of jobs in a CIM environment when a CIM provider is loaded, for example, during a CIM provider initialization process. A CIM provider may undergo initialization as a result of, for example, an unexpected shutdown of the system, an intentional reboot of the system, or after a CIMOM stalls or stops and must be restarted. Generally a method of the disclosure for managing CIM jobs during provider initialization comprises the step of determining whether a cache exists for storing information relating to CIM jobs. Generally a provider determines whether the cache exists. In one embodiment of the method if such a cache does not exist then one is created. The cache may be a file in any language known in the art to be useful for encoding structured information and/or representing data. In one embodiment of the disclosure, the cache is a file written in Extensible Markup Language (XML). In another embodiment of the disclosure, the cache is an XML file named CIM_ConcreteJob_Status.xml. The information stored in the cache may be any information relating to CIM jobs including but not limited to, a unique identifier for each job, the status of each job, what action, if any, is to be taken if a job is interrupted, and whether a job requires a reboot of the system.

The method may further comprise selecting from the cache any one or more instances whose corresponding jobs may not have completed. Incomplete jobs may result from the shutdown of an information handling system, or a provider being stalled or stopped. One approach for selecting instances from the cache whose corresponding jobs have not completed is to select those instances comprising a job status parameter or tag, such as a JobState tag, having a value of "running" or "in progress". The method may further comprise determining whether the job requires a reboot of the system. This may be accomplished by selecting the job instance or instances comprising a reboot tag or parameter, such as a RequestReboot tag, having a value of "True." The method may further comprise executing any actions defined in the parameter or tag defining such actions, such as an ActionAfterReboot tag. Generally if there are no actions defined in the parameter for actions following reboot, the job state parameter for the job is set to "terminated." The method may further comprise updating a job's job status information and thus defining whether a job is completed, terminated, or running.

Figure 4:
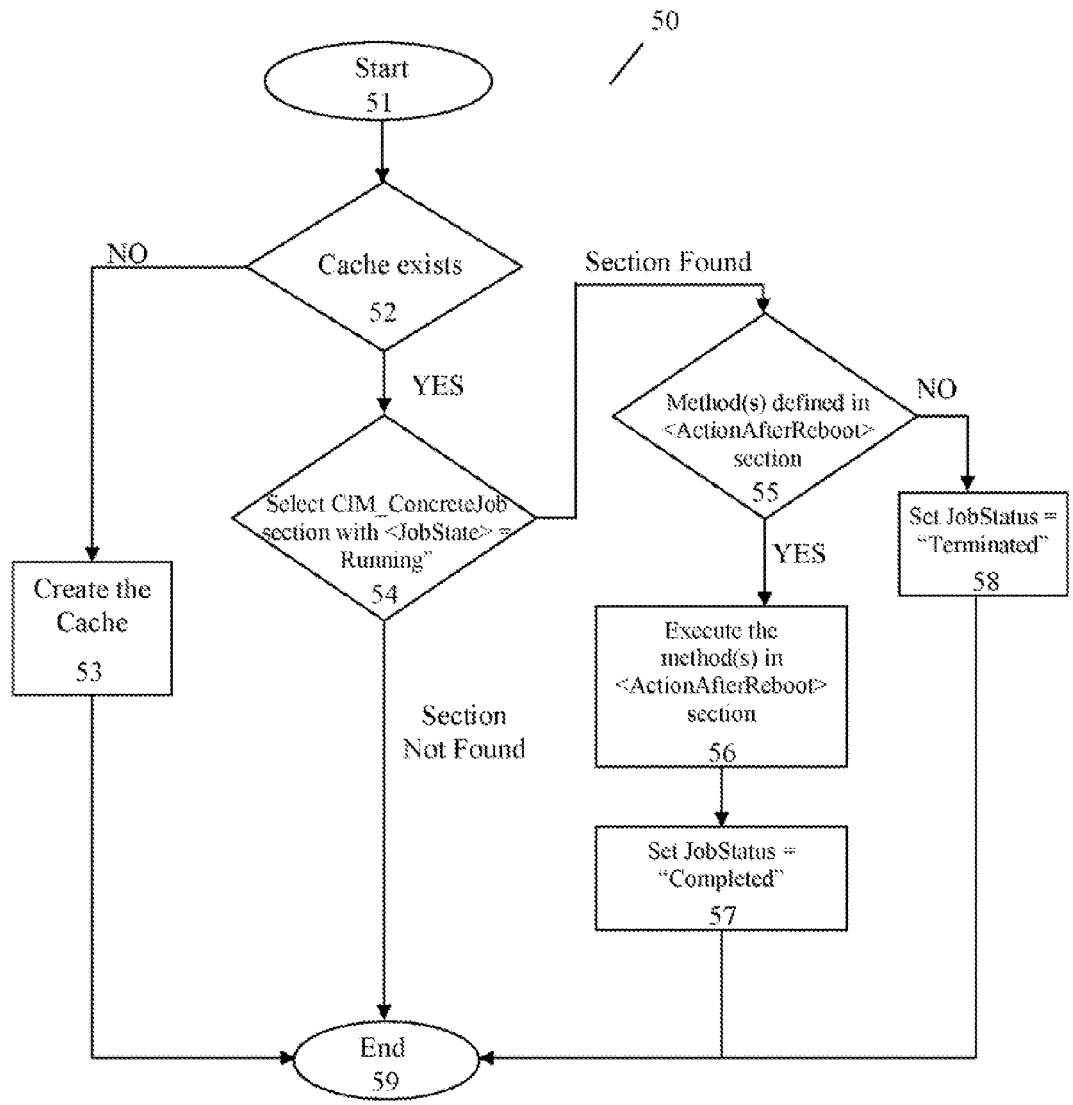
FIG. 4 provides a flowchart 50 illustrating an example method for managing CIM jobs.

Referring now to FIG. 4, flowchart 50 depicts an example method of managing CIM jobs, The method starts in step 51 and may be started when a provider is loaded during provider initialization. In step 52, the provider may determine whether a designated cache for CIM job information exists. If such a cache does not exist, then one may be created in step 53. In the example method depicted in FIG. 4, a suitable cache might be the XML file named CIM_ConcreteJob_Status.xml depicted in FIG. 1. If the cache does exist, then each section of CIM_ConcreteJob in the cache having a JobState tag of "Running" may be selected in step 54. If it is determined in step 54 that a section of CIM_ConcreteJob having a JobState tag of "Running" does not exist in the cache, then the method may end in step 59, In step 54, for each section of CIM_ConcreteJob comprising a JobState tag of "Running" found to exist, it may be determined in step 55 whether any methods are defined in the section's ActionAfterReboot tag, If the answer to step 55 is yes, there are methods defined in the ActionAfterReboot tag, then the methods may be executed in step 56. The JobState tag may then be set to "Completed" in step 57, and the method may end in step 63. If the answer to step 55 is no, there are no methods defined in the ActionAfterReboot tag, then in step 58 the JobState tag may be set to "Terminated", and the job may end in step 63.

The classes, class names, class instances, properties, tags, methods, tasks, definitions and values provided in FIGS. 1, 2, 3 and 4 are illustrative and are not intended to limit the scope of the specification and claims of the present disclosure.

In non-limiting embodiments, part or all of the data structures described herein may be stored on one or more information handling system readable media or transmitted in a propagated signal. In non-limiting embodiments, part or all of the methods described herein may be described as instructions for an information handling system, and stored on one or more information handling system readable media or transmitted by a propagated signal.

The present disclosure is to be taken as illustrative rather than as limiting the scope or nature of the claims below. Numerous modifications and variations will become apparent to those skilled in the art after studying the disclosure, including use of equivalent functional and/or structural substitutes for elements described herein, use of equivalent functional couplings for couplings described herein, and/or use of equivalent functional actions for actions described herein. Any insubstantial variations are to be considered within the scope of the claims below.

What is claimed is:

1. A computer-implemented method for managing jobs comprising the steps of:
    initiating a job of an object-oriented model on an information handling system;
    creating at least one data section in a cache;
    accessing the cache comprising the at least one data section, wherein each data section describes a corresponding job of an object-oriented model, wherein each data section comprises a job state parameter having an updated value describing the status of said corresponding job and wherein each data section-comprises an instance of the job, and an action after startup of the job state parameter which defines the action to be performed on an incomplete corresponding job during startup of an information handling system of said object-oriented model;
    selecting the instance from the cache which the corresponding job has not completed including to select each data section having a job state value of running;
    determining whether the job requires a restart of the information handling system by selecting the job instance comprising a startup parameter, having a value of true;
    if the startup parameter has the value of true, executing the action defined after startup of the job state parameter for said selected each data section having the job state value of running;
    wherein the action to be taken after startup comprises at least one of checking an update and verifying whether the Basic Input/output System (BIOS) version has been updated to the desired version and resuming the job; and
    updating the job state value of the job to completed.

2. The method of claim 1 wherein said object-oriented model is a common information model (CIM).

3. The method of claim 1 further comprising the step of:
    issuing a unique reference for said data section.

4. The method of claim 1 wherein said data section comprises an identification parameter having a value unique to said data section.

5. The method of claim 1 wherein said information handling system effects execution of stored action after startup parameter which defines an action to be performed on said job during start-up of said information handling system.

6. A computer-implemented method for managing jobs comprising the steps of:
- accessing a cache comprising at least one data section, wherein each data section describes a corresponding job of an object-oriented model, wherein each data section comprises a job state parameter having an updated value describing the status of said corresponding job and wherein each data section comprises an instance of the corresponding job, and an action after startup of the job state parameter which defines the action to be performed on an incomplete corresponding job during startup of an information handling system of said object-oriented model;
- selecting the instance from the cache which the corresponding job has not completed including to select each data section having a job state value of running;
- determining whether the corresponding job requires a restart of the information handling system by selecting the job instance comprising a startup parameter, having a value of true;
- if the startup parameter has the value of true, executing the action defined after startup of the job state parameter for said selected each data section having the job state value of running;
- wherein the action to be taken after startup comprises at least one of checking an update and verifying whether the Basic Input/output System (BIOS) version has been updated to the desired version and resuming the corresponding job; and
- updating the job state value of the corresponding job to completed.

7. The method of claim 6 wherein said object-oriented model is a common information model (CIM).

8. The method of claim 6 further comprising the step of:
- updating the job state value each time the status of said corresponding job changes.

9. The method of claim 6 wherein each data section comprises an identification parameter having a value unique to said corresponding job.

10. The method of claim 6 wherein said method is executed during startup of the information handling system.

11. An information handling system comprising:
- a cache;
- a processor;
- wherein the processor performs the steps of:
    - initiating a job of an object-oriented model on an information handling system;
    - creating at least one data section in the cache;
    - accessing the cache comprising the at least one data section, wherein each data section describes a corresponding job of an object-oriented model, wherein each data section comprises a job state parameter having an updated value describing the status of said corresponding job and wherein each data section comprises an instance of the job, and an action after startup of the job state parameter which defines the action to be performed on an incomplete corresponding job during startup of an information handling system of said object-oriented model:
    - selecting the instance from the cache which the corresponding job has not completed including to select each data section having a job state value of running;
    - determining whether the job requires a restart of the information handling system by selecting the job instance comprising a startup parameter, having a value of true;
    - if the startup parameter has the value of true, executing the action defined after startup of the job state parameter for said selected each data section having the job state value of running;
    - wherein the action to be taken after startup comprises at least one of checking an update and verifying whether the Basic Input/output System (BIOS) version has been updated to the desired version and resuming the job; and
    - updating the job state value of the job to completed.

* * * * *